(12) United States Patent
Crosswell

(10) Patent No.: US 8,083,155 B2
(45) Date of Patent: *Dec. 27, 2011

(54) ROLLING HERBICIDE APPLICATOR WITH AN ADJUSTABLE SHIELD

(75) Inventor: Elizabeth Gray Crosswell, Newport, NC (US)

(73) Assignee: Elizabeth Gray Crosswell, Newport, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/587,381

(22) Filed: Nov. 3, 2009

(65) Prior Publication Data
US 2010/0044456 A1    Feb. 25, 2010

Related U.S. Application Data

(63) Continuation of application No. 12/154,816, filed on May 27, 2008, now Pat. No. 7,654,470.

(51) Int. Cl.
*B05B 1/28* (2006.01)

(52) U.S. Cl. .......... 239/1; 239/146; 239/288; 239/288.5; 239/333; 239/379; 239/507; 239/513; 239/566; 239/578; 239/150; 222/505; 47/48.5

(58) Field of Classification Search .......... 239/146, 239/150, 288–288.5, 302, 303, 379, 505, 239/507, 513, 521, 566, 578, 754, 1; 222/505, 222/608; 47/1.7, 48.5
See application file for complete search history.

(56) References Cited

U.S. PATENT DOCUMENTS

| 964,178 A | | 7/1910 | Opitz et al. |
| 2,551,096 A | * | 5/1951 | Chittick ................. 239/146 |
| 2,605,587 A | * | 8/1952 | Wester et al. ............. 47/1.7 |
| 3,118,607 A | | 1/1964 | Rocher |
| 3,871,557 A | | 3/1975 | Smrt |
| 4,638,948 A | | 1/1987 | Marlek |
| 5,088,232 A | | 2/1992 | Aurness et al. |

* cited by examiner

*Primary Examiner* — Steven J Ganey

(57) ABSTRACT

A rolling liquid herbicide applicator with an adjustable shield is attached to a hollow pole having an adjustable width protective shield mounted to one end weighted, textured wheels for rolling over most terrains are attached to the adjustable width protective shield. On the opposite end of the hollow pole handle is a trigger. When the trigger is activated, an internal trigger stick is moved down through the hollow pole, thereby causing a "C" shaped piece to move upward. This upward movement pushes on a hard flat disk. The movement of the hard flat disk causes pliable cap center to move. The gravity flow of liquid herbicide from a liquid herbicide container causes the liquid herbicide to move through a tube and nozzle assembly. The adjustable width protective shield over the nozzle prevents overspray and accidental contact of the liquid herbicide on healthy desired vegetation.

2 Claims, 3 Drawing Sheets

ROLLING HERBICIDE APPLICATOR WITH AN ADJUSTABLE SHIELD

CROSS REFERENCE TO RELATED APPLICATION

This application is a continuation of U.S. patent application Ser. No. 12/154,816 filed May 27, 2008, now U.S. Pat. No. 7,654,470.

STATEMENT REGARDING FEDERALLY FUNDED RESEARCH AND DEVELOPMENT

The invention described in this patent application was not the subject of federally sponsored research or development.

FIELD

The present invention relates to lawn and garden weed eliminators and, more particularly, to a device for accurately applying liquid herbicide to undesirable vegetation by including protection against the overspray of liquid herbicide.

BACKGROUND

Many herbicide agents presently available require that the operator bend over and then hand pump a sprayer to apply the chemical to the leaves or to the base of undesirable vegetation. This bending over and hand pumping a chemical sprayer can be painful to the back and to the hands of the operator as well as being very time consuming. Additionally, there is a risk of destroying healthy desired vegetation by accidental contact of the healthy desirable vegetation with the herbicide. Such accidental contact of herbicide with healthy desirable vegetation can occur from overspray, from the wind blowing the sprayed droplets of liquid herbicide, or from the leaves of desirable vegetation hanging downwardly near mulch beds. Thus, there is a need in the art for an apparatus that will spray liquid herbicide underneath an adjustable protective shield to prevent overspray of the liquid herbicide.

Other prior art devices for controlling undesirable vegetation include:
  Gas weed trimmer
  Electric weed trimmer
  Weed scissors
  Weed killer sprayers with hand pump
  Liquid sprayers
  Brick paver pick Gas powered and electric weed trimmers are heavy and must be held up above the ground. In addition, gas powered and electric weed trimmers do not get into small cracks very well. It is time consuming for an operator to hit each weed or undesirable piece of vegetation with a gas powered or electric weed trimmer.

Weed scissors are exhausting to the hand of an operator.

Liquid sprayers do not provide protection from overspray of liquid weed killer.

The use of weed killer in hand-pumped sprayers is exhausting to the operator. In addition, the operator must bend over to apply the chemical to the weed leaf or the base of the undesired vegetation. Further, such hand-pumped sprayers also do not provide protection from overspray, or the wind blowing the droplets in the chemical mist on to healthy desired vegetation or into the eyes or onto the exposed skin of the user.

It would therefore be advantageous to provide an apparatus which enables precise application of liquid herbicide onto the undesired vegetation.

It would also be advantageous to provide an ergonomically friendly way to apply liquid herbicide onto undesired vegetation.

It would be still further advantageous to provide an apparatus for accurately applying liquid herbicide on undesired vegetation with prevention of overspray, splatter, or accidental contact of herbicide with surrounding healthy desired vegetation, the eyes of the operator, or the skin of the operator.

SUMMARY

In accordance with the present invention, there is provided a rolling herbicide applicator with an adjustable width protective shield.

A container holder to hold the liquid herbicide is placed on a hollow pole with the container cap being located at the bottom of the liquid herbicide container. At the bottom of the hollow pole is located an adjustable protective shield.

Weighted textured wheels are located on either side adjustable width protective shield for rolling over most terrains. By placing weighted textured wheels on each side of the adjustable width protective shield, the rolling herbicide applicator with an adjustable width protective shield of the present invention can be rolled over a variety of different types of terrain. The disclosed apparatus can be easily rolled over brick walkways, fence lines, patios, and grass to create borders around flower beds, and to make swaths over a large area, in and about garden areas, and mulch beds. Flower bed perimeters may require the use of the narrower width adjustment of the adjustable width protective shield, while driveways, brick pavers and large areas may require the use the wider width adjustment of the adjustable width protective shield for effective application of liquid herbicide.

On the handle on the top of the hollow pole is a trigger. When the trigger is pulled a trigger stick is pushed down through the hollow pole. This pushing of the trigger stick will cause the hinge pin apparatus to force a "C" shaped piece upward, thus pushing on a hard flat disk. The hard flat disk will push up through the pliable cap center and allow the upper portion of the hard flat disk to move through and above the internal cap. This movement of the hard flat disk allows gravity to initiate the flow of the liquid herbicide from the liquid container through a tube traveling down through the hollow pole to underneath the protective shield. The liquid herbicide is then dispensed onto the undesired vegetation through a nozzle.

The protective shield which surrounds the nozzle prevents overspray and accidental contact of the liquid herbicide on plants or grass that the operator does not wish to kill. The width of the protective shield may be adjusted to provide the desired width of liquid herbicide application.

DESCRIPTION OF THE DRAWING FIGURES

A complete understanding of the present invention may be obtained by reference to the accompanying drawing figures, when considered in conjunction with the Description of the Embodiments wherein.

DESCRIPTION OF THE EMBODIMENTS

Figure 1:
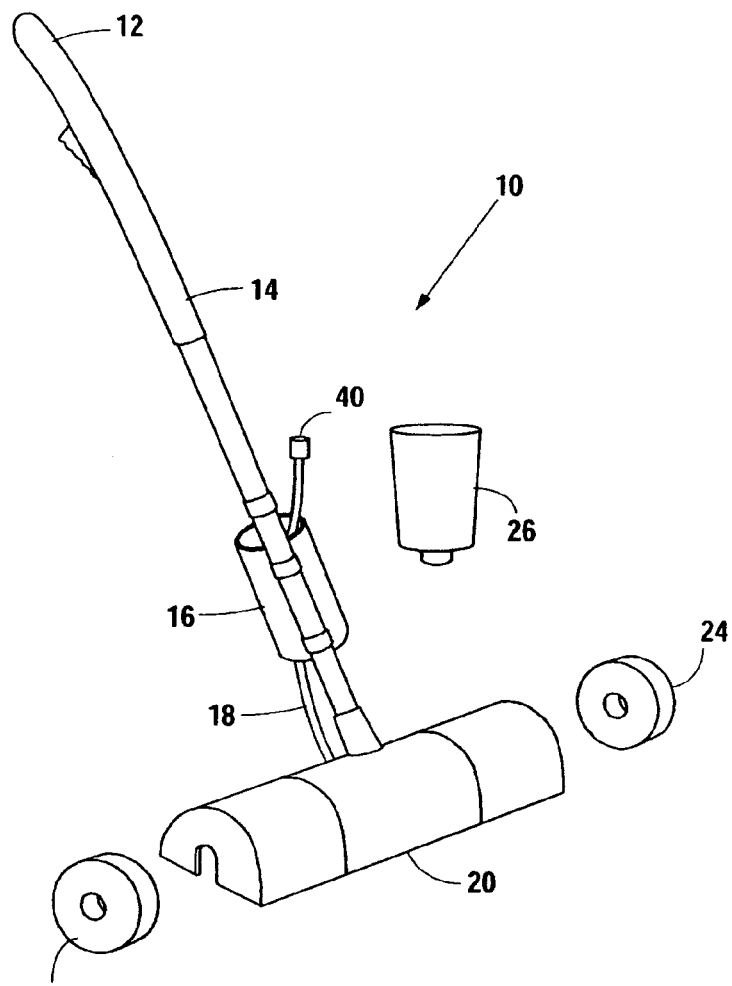
FIG. 1 is a perspective view of the rolling herbicide applicator with an adjustable width protective shield of the present invention shown partially disassembled.

For purposes of clarity and brevity, like elements and components will bear the same designations and numbering throughout the Drawing Figures.

FIG. 1 is a perspective view of the rolling herbicide applicator 10 with an adjustable width protective shield 20 of the present invention shown partially disassembled.

Figure 2:
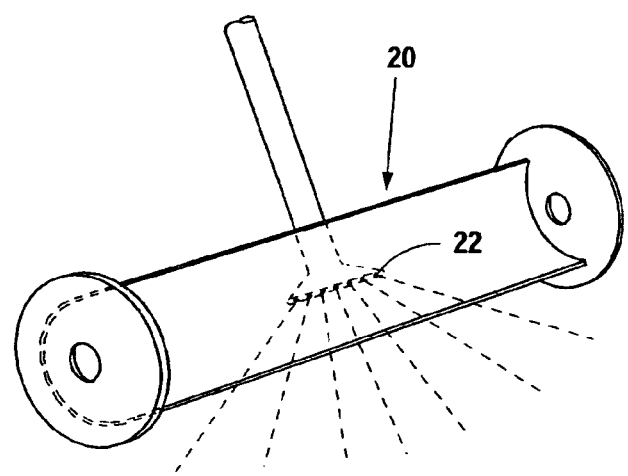
FIG. 2 is an enlarged perspective view of the bottom of the rolling herbicide applicator with an adjustable width protective shield showing the spray of herbicide droplets.

FIG. 2 is an enlarged perspective view under the adjustable width protective shield 20 showing the spray of herbicide droplets.

Figure 3:
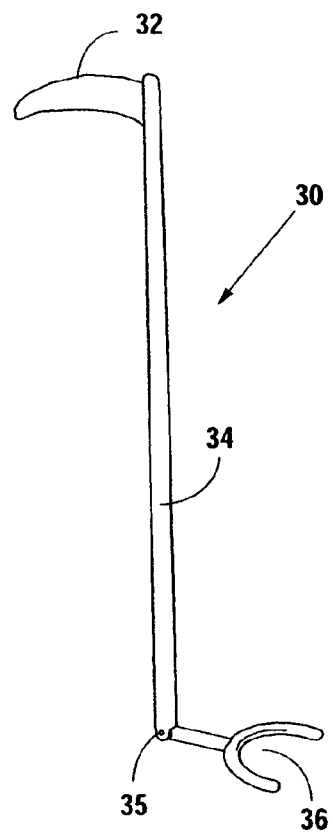
FIG. 3 is a perspective view of the spray activating assembly including the trigger stick, and "C" shaped piece assembly.

FIG. 3 is a perspective view of the spray activation assembly 30 including the trigger, trigger stick and C-shaped piece assembly.

Figure 4:
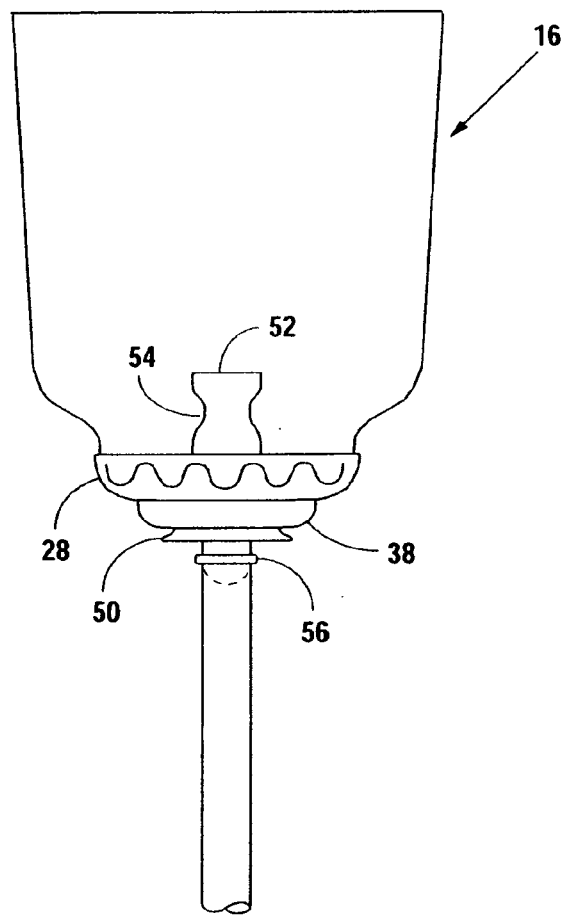
FIG. 4 is an enlarged side elevational view of the liquid herbicide container and the cap assembly.

FIG. 4 is an enlarged side elevational view of particularly, the liquid herbicide container 16 and the cap assembly 40.

Figure 5:
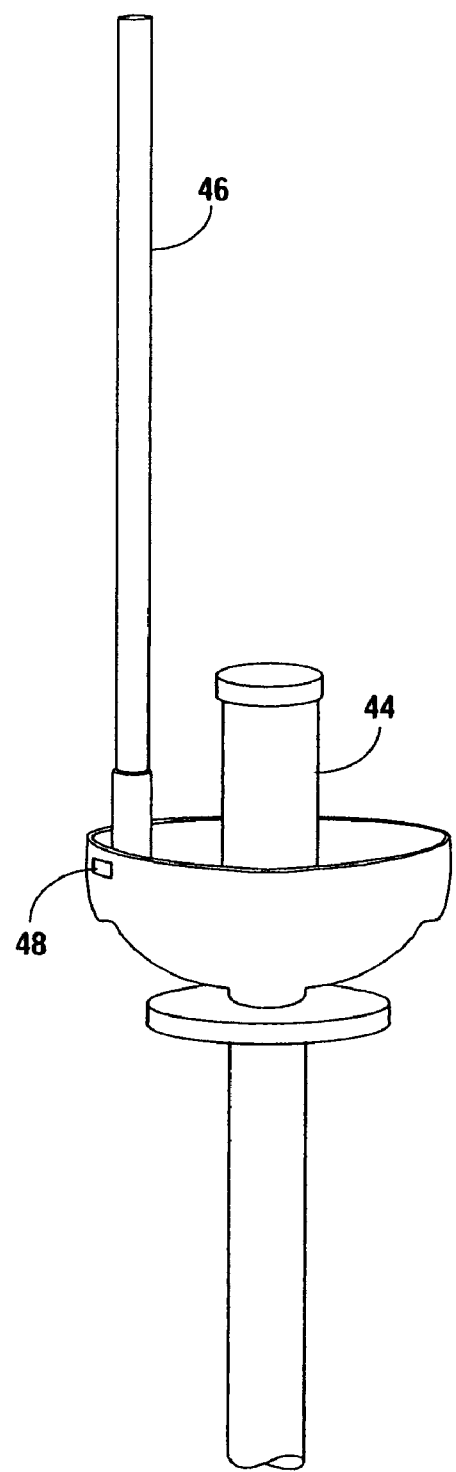
FIG. 5 is an enlarged side elevational view of the internal cap assembly which fits on the liquid herbicide container.

FIG. 5 is an enlarged side elevational view of the internal cap 44 assembly.

The rolling herbicide applicator with an adjustable width protective shield 10 of the present invention allows for ergonomical use and precise application of liquid herbicide without the risk of overspray or accidental contact of the herbicide with healthy desired vegetation, the eyes of the operator, or the skin of the operator.

The rolling herbicide applicator with 10 an adjustable shield 20 as shown in FIG. 1 includes a hollow pole 14 with a handle 12 positioned on its upper end. The handle 12 may be fabricated of plastic or any suitable material and may have a textured grip to allow for a more secure hand grip and maneuverability of the entire rolling herbicide applicator 10.

On the side of the hollow pole 14 is attached a liquid herbicide container 16 holder 26. This liquid container holder 26 may include an open slit the same size of the tubing 18 extending downwardly from the liquid container 16 to allow the tubing 18 to continue downward to the nozzle 22 located under the adjustable width protective shield 20.

Liquid herbicide is first placed in the liquid herbicide container 16. The liquid herbicide container 16 is then attached to the internal cap assembly 44, the pliable cap center 38, and the hard flat disk 50 by threadably engaging the internally threaded outer cap ring 28 as seen in FIG. 4. This combination of the internal cap 44, the plastic cap center 38 and the hard flat disk 50 will, when threaded onto the top of external threads on the liquid herbicide container 16, house all the internal cap assembly 44 parts as shown in FIG. 5. The liquid herbicide container 16 is then turned cap side down and placed into the liquid container holder 26 on the side of the hollow pole 14. The liquid herbicide container 16 may be held firmly in place by a fitted design of the liquid herbicide container 16 and the liquid container holder 26.

The internal cap assembly 44 as shown in FIG. 5 contains an air vent hole 48. The air vent hole 48 is large enough to allow ventilation of the liquid herbicide container 16. This ventilation of the liquid herbicide container 16 is accomplished with the air vent hold 48 being connected to the air vent tube 46.

Shown in FIG. 3 is the spray activation assembly 30, which includes a trigger 32. When the trigger 32 is pulled the internal trigger stick 34 is caused to move down. This downward movement causes flexion of the hinged portion 35 and forces the "C" piece 36 at the bottom of the trigger stick 34 in an upward direction. When the "C" piece 36 moves in an upward direction it pushes the hard flat disk 50, shown in FIG. 4, in an upward direction. The pushing of the hard flat disk 50 in an upward direction moves the upper portion 52 of the attached hard flat disk 50 through the pliable cap center 38 and thereby allows a controlled volume of liquid herbicide to flow through the drainage opening 54 portion of the hard flat disk 50 shown in FIG. 4.

As discussed above, when the liquid herbicide flows through the drainage opening 54 in the upper portion 52 of the hard flat disk 50 and the liquid herbicide travels downwardly through the tubing 18. The tubing 18 is secured to the hard flat disk 50 by a metal clip 56 or other suitable clamping device.

The tubing 18 in the adjustable shield 20 passes through a space, which space is the same size as the tubing 18 and connects the tubing 18 to the nozzle 22 for propelling the droplets of the liquid herbicide to the location to be treated with the liquid herbicide.

The adjustable width protective shield 20 being made of plastic or any other suitable material, may be slid into itself to create an adjustment of the width of the adjustable protective shield 20 and thereby control the width of the liquid herbicide application to undesired vegetation.

The adjustable protective shield 20, as described above has attached weighted and substantially textured wheels 24. The substantially textured wheels 24 may be crafted of metal and rubber material, however, any suitable materials may be used. The size and type of wheel assembly is not critical to the operability of the disclosed invention 10.

In the above discussion of the preferred embodiment of the invention, the use of gravity flow of liquid herbicide is shown. Those of ordinary skill in the art will understand that the flow of the liquid herbicide may be initiated by the use of a motorized or manual pump.

It should be noted that different types of liquid herbicide formulations may be suitable for use. This would include, but not limited to pre-mixed liquids and/or pre-filled containers.

The present invention may, be constructed and enabled in other ways than those set forth without departing from the essential characteristics of the disclosed invention. Accordingly, the invention is not limited to that which is specifically described in the appended claims.

I claim:

1. A system for controlling the placement and size of a liquid herbicide spray on undesired vegetation, said system comprising:

liquid herbicide dispenser including:
   a handle mounted on a hollow pole;
   a liquid herbicide container mounted to said hollow pole;
   a liquid herbicide spray activation mechanism which causes a stream of liquid herbicide to be dispensed from said liquid herbicide container through a tube when a trigger within said handle is depressed;
a nozzle assembly affixed to the end of said tube, said nozzle assembly causing said liquid herbicide to form into droplets;
an adjustable width protective shield affixed to said hollow pole, said adjustable width protective shield being constructed and arranged for containment of said liquid herbicide spray dispensed from said nozzle assembly;
said adjustable width protective shield including two segments, one segment slidably nested within the other segment;
a pair of wheels affixed on either end of said adjustable width protective shield whereby an operator may place liquid herbicide spray over undesired vegetation and prevent the liquid herbicide from being sprayed on anything other than the undesired vegetation.

2. A method for controlling the placement and size of a liquid herbicide spray on undesired vegetation, said method comprising the steps of:
   creating a walk-behind liquid herbicide spray dispenser including:
      a handle mounted on a hollow pole;
      a refillable liquid herbicide storage container mounted to said hollow pole;
      a controlled volume liquid dispensing system attached to said refillable liquid herbicide storage container, said controlled volume liquid dispensing system being activated by placing pressure on a trigger;
      a tube for conducting said controlled of liquid herbicide away from said refillable liquid refillable liquid herbicide storage container;
      a nozzle assembly affixed to the end of said tube;
   affixing an adjustable protective shield to said hollow pole to contain the spray released from said nozzle assembly;
   affixing a wheel to either end of said adjustable protective shield wherein said adjustable protective shield includes two slidable segments, one segment nesting within the other segment when a width of said adjustable protective shield is changed.

\* \* \* \* \*